United States Patent [19]
Munt

[11] 3,786,350
[45] Jan. 15, 1974

[54] LINEAR INPUT OHMMETER

[75] Inventor: Irwin Munt, Elizabeth, N.J.

[73] Assignee: Weston Instruments, Inc., Newark, N.J.

[22] Filed: Aug. 21, 1972

[21] Appl. No.: 282,019

[52] U.S. Cl. ........ 324/62 R, 324/99 D, 340/347 NT
[51] Int. Cl. ............................................. G01r 27/02
[58] Field of Search ............. 324/62 R, 99 D, 99 R, 324/111; 340/347 NT

[56] References Cited
UNITED STATES PATENTS

| | | | |
|---|---|---|---|
| 3,711,850 | 1/1973 | Kelly | 324/62 X |
| 3,060,379 | 10/1962 | Osvold | 324/62 |
| 3,490,039 | 1/1970 | Tsao | 324/62 |
| 3,566,265 | 2/1971 | Reid | 324/99 D |
| 3,710,248 | 1/1973 | Bloomfield | 324/99 D |

Primary Examiner—Stanley T. Krawczewicz
Attorney—Roylance, Abrams, Berdo & Raul

[57] ABSTRACT

A digital ohmmeter having a differential amplifier with a capacitor connected between the output and the inverting input to form an integrator. A source of DC voltage is connected to a series circuit including the unknown resistor and to a switch which selectively connects the source to a second series circuit, an intermediate point of which is connected to the inverting terminal of the amplifier. The unknown resistor is connected to the noninverting input. The output of the amplifier is connected to logic circuit and counting means of the type used in dual slope integrating digital voltmeters, and others such as voltage-to-frequency converters, with the logic means having an output to control the switch means. The switch is open for a fixed interval and closed for a variable interval, which variable interval is counted as a measure of the input resistance. In this embodiment, the two series resistance circuits form a bridge when the switch is closed. In a second embodiment an additional switch connects the second series circuit to ground when it is disconnected from the source. In either embodiment the resistance value is linearly proportional to the length of the variable interval of time multiplied by a constant, the constant being determined by the fixed resistors in the two series circuits.

4 Claims, 6 Drawing Figures

LINEAR INPUT OHMMETER

This invention relates generally to ohmmeters and, more specifically, to the conversion of ohmic values to representative analog or digital readouts.

BACKGROUND

The conversion of a measured or unknown resistance value to a representative analog readout is conventionally accomplished by an electromagnetic meter movement with an appropriately calibrated scale or dial and some type of indicating device such as a pointer which is driven to differing positions relative to the scale by a current or voltage which is developed by a signal source connected to the resistance and which is usually nonlinearly related to the ohmic value of the measured resistance. The value is presented and determined by the observer based on the relative position of the pointer and the scale.

The conversion of a measured resistance value to a representative digital readout is conventionally accomplished with numerical displays which are appropriately driven by digital signals to provide a representative numerical indication of the ohmic value of the measured resistance.

Regardless of the specific type of readout, the measured resistance is typically initially translated into an electrical voltage which can then be processed to provide the readout drive. To make the initial ohms-to-voltage translation a current is generated and fed to the measured resistance to produce a DC or analog voltage across the resistance. The analog voltage is then fed to, and processed by, what may be termed a "conversion circuit" to generate appropriate driving signals for the analog or digital readout. The conversion typically involves integration of an analog current proportional to the analog voltage and the conversion circuit therefore typically includes a linear integrating circuit.

It is frequently required that a given range of resistance values be measured and that the driving signals accurately represent the various resistance values in the selected range. Minimally, this requires that the analog voltages fed to the conversion circuit be linearly related to the ohmic values of the measured resistances. When the transfer function is non-linear, measurement errors are created between the actual and converted ohmic values of the measured resistance. To compensate for these non-linearities, conversion systems which are designed to accompany analog readouts typically calibrate the readout, i.e., the meter scale, in an offsetting non-linear manner. To compensate for these non-linearities in conversion systems which feed digital readouts, an arrangement can be provided at the input of the conversion circuit by, for example, bootstrapping the voltage fed to the input of the conversion circuit to the resistance under measurement in such a way as to insure that a constant current is delivered to the measured resistance. However, this expedient presently involves adding compensating circuitry to the conversion circuit input to offset non-linearities, resulting in an increase in the cost and complexity of the ohmmeter.

Various approaches which have been taken in the prior art in an effort to improve the reliability, operative characteristics and accuracy of resistance measurements are illustrated by three documents which will now be briefly discussed.

One of these is an article by Gerald Beene in the May, 1972 issue of "Popular Electronics," entitled "A Linear-Scale Ohmmeter" which shows a schematic circuit for a simplified constant current source. The circuit, which is an approximation of a constant current source, produces a current to be passed through the unknown resistor to develop a voltage which is read on a vacuum tube voltmeter. This circuit, while useful, has the limitations of providing only an approximation of constant current and, in addition, requires that two separate power supplies be used or else that complex amplifier circuits be used in order to isolate the constant current supplies from the meter supplies.

A second approach is described in an article entitled "Twelve Functions in a New Digital Meter", by Kay and Harmon, Hewlett-Packard Journal, March, 1969. Three different methods of measuring resistance using dual slope analog-to-digital converters, in conjunction with a converter for converting ohmic value to a DC voltage, are described. Two of the methods, as described in the material at page 11, employ a precision voltage source to generate a controlled current to the resistor under test. Yet another technique appears on page 12, this approach being to solve the equation of proportionality:

$$V_{rx}/V_{ref} = R_x/R_{ref} \tag{1}$$

where
 $V_{rx}$ = the voltage across the unknown resistor
 $V_{ref}$ = the voltage across the reference resistor
 $R_x$ = value of the unknown resistor
 $R_{ref}$ = value of the reference resistor.

This instrument essentially determines the value of a current by passing the current through a resistor of known value and, using an operational amplifier, passing the same current through the unknown resistor. The voltages across these two resistors can then be used in the above equation to determine the unknown resistance. A deficiency in this circuit is that it involves a rather complicated analog solution.

Finally, an article entitled "A Linear-Scale Ohmmeter", by Dee L. Larson of Hewlett-Packard describes still another technique using a precision voltage source and a known resistor to establish a known current. Using an operational amplifier, the same known current is passed through the unknown resistor. Measurement of the voltage generated across the unknown resistor, using a high impedance voltmeter, presents a technique for providing a resistance value. The significant features of this circuit are that while the known current is caused to pass through the unknown resistor, the operational amplifier is so employed as to prevent the value of the unknown resistor from influencing the value of the known current.

Although the technique of establishing the unknown resistor as established in this article differs from the previously described Hewlett-Packard technique, the approach of using an operational amplifier to isolate a known current from the current passing through the unknown resistor is generally similar.

As will be recognized, the foregoing techniques are fundamental adaptations of analog measurement and conversion techniques to the input of any voltmeter and have considerable flexibility, but do not provide a simple well-integrated overall circuit approach. Additionally, some schemes are simple but limited in accuracy over wide measurement ranges.

Accordingly, it is an object of the present invention to provide an ohmmeter which has a linear resistance-to-readout transfer function over a wide range of resistance values without resorting to expensive prior art compensating techniques.

Another object is to provide an integrating type of conversion system for converting an ohmic value into an electrical pulse of proportional pulse width which makes use of a ratio technique to linearize the ohms-to-pulse width conversion and to substantially decrease the problem of instability in precision reference signal sources utilized by previous conversion systems.

Yet another object is to provide a conversion system in which an ohmic value is represented by a train of electrical pulses the frequency of which is proportional to the ohmic value.

Briefly described, the present invention includes a voltage source, which is essentially fixed but need not be a precision source, connected to supply a current through an unknown resistor to develop a voltage which is connected to one input of a differential amplifier. The amplifier is provided with capacitive feedback to the other input to form an integrator. The voltage source is switchably connectable to a second resistive circuit, which is connected to the integrating input, the switch being operated by conversion control logic at the integrating amplifier output. The value of voltage developed across the unknown resistor increases non-linearly with the value of the unknown. A compensating signal is supplied by switching the voltage source to the second circuit so that a compensating voltage, which is of inverse non-linearity, is supplied to the integrator. The two signals are combined in the integrating differential amplifier within a measurement cycle so that the output at the end of each cycle is linearly representative of the ohmic value at the input, which value is delivered to suitable readout apparatus. The switch operation is controlled by conversion control logic and timing circuits.

In order that the manner in which the foregoing and other objects are attained in accordance with the invention can be understood in detail, a particularly advantageous embodiment thereof will be described with reference to the accompanying drawings, which form a part of this specification, and wherein.

Figure 1:
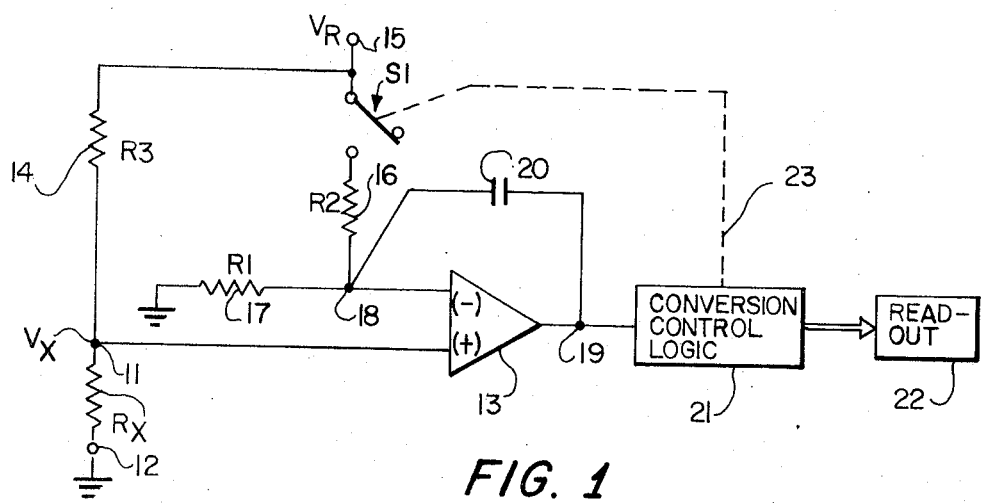
FIG. 1 is a schematic diagram, partly in block form, of one embodiment of an apparatus according to the invention.

Turning now to the drawings in detail, it will be seen that FIG. 1 illustrates one embodiment of an ohmmeter constructed in accordance with the present invention in which a resistance of unknown value, $R_x$, is connectable to the ohmmeter for measurement of its ohmic value. The end terminals of the unknown resistance are electrically connected to a junction 11 and to a terminal 12 which is at constant potential, typically ground. The junction 11 is connected to a noninverting (plus) input of a conventional differential amplifier 13.

A fixed resistor 14 of known and substantially constant value R3 is connected in series circuit relationship with the unknown resistor, one end of resistor 14 being connected to junction 11 and the other terminal of the resistor being connected to a terminal 15 to which a source of reference voltage $V_r$ is connected. Terminal 15 is also connected to the switchable conductive path of a switching means illustrated in FIG. 1 as a single-pole double-throw switch S1, terminal 15 being connected to the movable contact thereof. The fixed contact of switching means S1 is connected to one terminal of a resistor 16 which is a fixed resistor of known, substantially constant value R2. Resistor 16 is connected in series circuit relationship with a fixed resistor 17 of known, substantially constant vlaue $R_1$, the other terminal of resistor 17 being connected to ground. The junction of resistors 16 and 17 is identified as junction 18 and is connected to the inverting input of differential amplifier 13.

At the output of amplifier 13 is a junction 19 to which is connected one terminal of a fixed capacitor 20, the other terminal of capacitor 20 being connected to junction 18 at the inverting input to the amplifier. Junction 19 is also connected to the input of a conversion control logic unit 21 which provides electrical outputs to a readout unit 22. Logic unit 21 also provides a control signal, illustrated schematically in FIG. 1 as a mechanical linkage 23, to control the action of the movable portion of switch S1.

Before entering into a discussion of the operation of the circuit of FIG. 1, it should be recognized that there are certain significant characteristics of the differential amplifier which are used by this circuit. First, the voltage applied to the noninverting input terminal thereof appears as having the effect of a current at the inverting input terminal, so that a voltage of $V_x$ applied at terminal 11 amounts to the application of a current equal to $V_x/R1$ applied to the inverting input terminal. This current is then integrated by the amplifier, absent any conflicting or additional input signal at that point. The gain of such an amplifier is assumed to be very large, an assumption easily realizable with present amplifiers. Also, it will be recognized that substantial input impedance is presented at the noninverting input terminal such that it can be reasonably assumed that no current flows from terminal 11 to the noninverting input of the amplifier.

The operation of the apparatus is commenced with switch S1 in the open position, as shown. Voltage applied at terminal 15 produces a current through resistor 14 and the unknown resistor, resulting in a voltage $V_x$ at junction 11, which voltage is representative of the resistance value $R_x$ in the manner previously described. So long as $S_1$ remains open, a current equal to $V_x/R_1$ is fed to terminal 18 for integration. When switch S1 is closed, a current equal to $$- V_x/R_1 + [(V_R - V_x)/R_2]$$

is applied to terminal 18. By operation of the control aspect of the conversion control logic 21, and assuming a given value of $R_x$ and further assuming that the ohmmeter has attained a steady state condition of operation, switch S1 will be closed for a total time interval $T$, which is a given fraction of the total time of a conversion cycle as determined by control logic 21. Thus, in a given conversion cycle, the steady state relationship existing at junction 18 is established as follows:

$$V_x/R_1 = [(V_R - V_x)/R_2]T \quad (2)$$

wherein $T$ represents that part of the conversion cycle when the switch S1 is closed. Alternatively, $T$ can be defined as the duty cycle with which the switch is closed, depending upon the nature of the specific conversion circuitry used. In either event, $$T = \frac{\frac{V_x}{R_1}}{\frac{V_R - V_x}{R_2}} = \frac{V_x R_2}{R_1(V_R - V_x)}. \quad (3)$$

Since resistor 14 forms a voltage divider with the unknown resistor, it can be said that $$V_x = V_R [R_x/(R_x + R_3)] \quad (4)$$

From this, $$V_R = [V_x (R_x + R_3)]/R_x \quad (5)$$

which can be substituted into equation (3) to yield $$T = \frac{V_x R_2}{R_1 \left[\frac{V_x(R_x + R_3)}{R_x} - V_x\right]} = \frac{R_2 R_x}{R_1 R_3}. \quad (6)$$

Solving for $R_x$, $$R_x = T [R_1 R_3/R_2], \quad (7)$$

demonstrating that the unknown resistance is purely a function of the factor $T$ multiplied by a constant, the constant being a function solely of the values of fixed resistors in the circuit. It will be further noted that this is a linear relationship.

It will be recognized that resistor 14 can be replaced by a plurality of fixed selectable resistors having values related by factors of 10, for example, to constitute a range switch.

Figure 2:
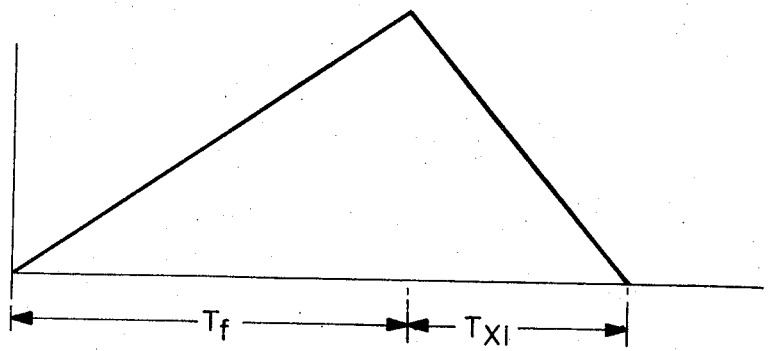
FIGS. 2–4 are waveform and timing diagrams used in explanation of the invention.
Figure 3:
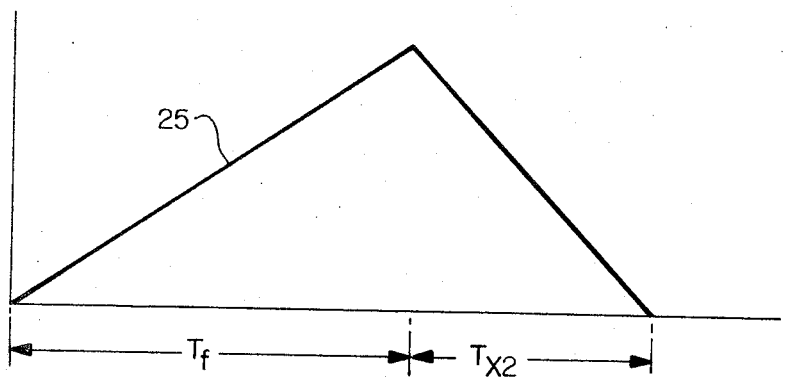
Figure 4:

In considering the operation of the circuit of FIG. 1, it will be helpful to refer to FIGS. 2–4, in which the wave forms and timing relationships related to this apparatus are shown. First, a brief review of the operation of one type of converter will be undertaken to provide a basis for discussing the operation of the apparatus of the invention with a similar type of converter. It will be recognized, however, that various kinds of converters can be used and simply adapted to the apparatus of the invention.

In FIG. 2 is shown a typical integration wave form for a simple dual slope converter in which a fixed input signal is applied to the input of an integrating amplifier for an interval of time $T_f$. At the end of that time interval, a reference signal produced by a constant current source, of opposite polarity to the input signal is applied to the integrator to discharge the integrating capacitor. The application of the input signal creates a ramp in one direction and the application of the reference signal generates a ramp having an opposite slope so that the signal at the output of the integrator moves away from and then toward a datum level. A comparator circuit is generally used to determine the arrival of the second ramp at the datum level and a gated clock and counter arrangement is used to measure pulses during the interval between slope reversal and arrival at the datum, this interval being identified in FIG. 2 as $T_{x1}$. Thus, the apparatus measures or counts pulses during $T_{x1}$ and displays that count as a measure of the magnitude of the input signal. The operation of such a converter is now well-known and need not be described in any further detail.

When adapted to the present invention, a converter having similar operation can be used but with some modifications. It can be assumed that if the converter, the operation of which is described with reference to FIG. 2 with $V_R$ and $R_2$ replaced with a constant current, is used to measure the voltage $V_x$ at 11 in FIG. 1, and to present a display representative of $T_{x1}$, that the display would be in error because $V_x$ does not truly represent $R_x$ over any significant range of values of $R_x$. This requires that a correction be made and that the value to be displayed be increased, in this example, to display the proper value representative of each $R_x$. Thus, switch S1 provides a periodic corrected current to the integrator under the control of the conversion circuitry to supply the correct slope for the second ramp during the interval $T_x$.

FIG. 4 shows a typical timing diagram for switch S1. When $V_x$ is applied to the noninverting input of the amplifier and with switch S1 open, the slope is that as shown on 25 in FIG. 3, for an assumed exemplary value of resistance $R_x$, the output of the integrator building to a value dependent upon the resistance value during the interval $T_f$. At the termination of that interval, the conversion control logic 21 closes switch S1 and applies a reference signal to the inverting input terminal of the amplifier through the voltage divider, generating a ramp at the output of the amplifier which is less steep in slope than the return slope of the apparatus of FIG. 2, this slope then reaching the datum level in an interval $T_{x2}$ which is longer than $T_{x1}$. The count accumulated during interval $T_{x2}$ more accurately represents the value of resistance $R_x$, and is linearly proportional to $R_x$ values over a wide range thereof.

It will be observed that the same voltage source is used to develop the signal $V_x$ and to develop the compensating signal through resistors R1 and R2 which is employed as the reference signal.

Figure 5:
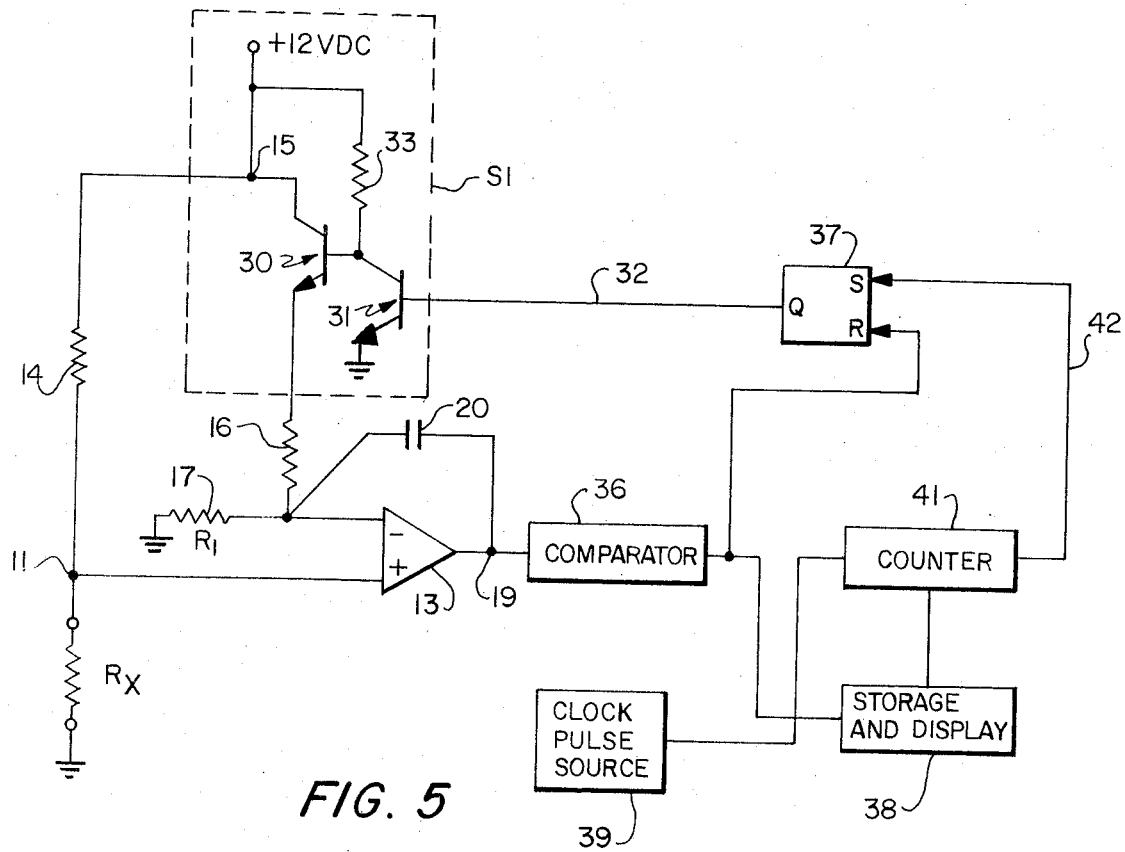
FIG. 5 is a more detailed schematic diagram, partly in block form, of an apparatus according to the invention.

A more detailed drawing of an apparatus in accordance with the invention is shown in FIG. 5, which is similar to the apparatus of FIG. 1 and similar reference numerals for counterpart components are therefore used. As will be seen, the reference voltage source and the switch is shown in FIG. 5 as a practical solid state embodiment incorporating conventional NPN transistors indicated generally at 30 and 31. A control signal from the conversion control logic arrives on a conductor 32 at the base electrode of transistor 31, the emitter electrode of which is connected to ground. The collector of transistor 31 is connected to the base electrode of transistor 30 and, through a biasing resistor 33, to positive DC voltage source. The collector of transistor 30 is connected to a DC voltage source and one terminal of resistor 14. The emitter electrode of transistor 30 is connected to resistor 16.

The junction to which the collector of transistor 30 is connected can be regarded as terminal 15 of FIG. 1 in that it is that point to which resistor 14 is connected and it is also that point to which switching transistor 30 is connected. When rendered conductive by a signal on conductor 32, transistor 31 renders transistor 30 conductive and the resistance thereof through the emitter collector circuit drops to a negligible level so that resistor 16 is essentially connected to junction 15.

The remaining resistors and the integrator circuit are essentially as shown in FIG. 1. The conversion control logic is shown in more detail in FIG. 5, the output of the integrator being connected to the input of a comparator circuit 36, the purpose of which is to produce an output signal when the ramp returns to a datum level. The output of the comparator is connected to the reset input of a bistable circuit 37 and to a storage and display circuit 38. A clock pulse source 39 is connected to the input of counter 41. An overflow output from counter 41 is provided on a conductor 42 to the SET input of bistable circuit 37.

In operation, the counter can be permitted to run essentially continuously, receiving pulses from clock pulse source 39. At the initiation of a measurement cycle, which is triggered by circuit means not shown in response to an overflow from counter 41, the voltage from terminal 11 is applied to the amplifier input and ramp 25 (FIG. 3) begins to develop at junction 19. Upon overflow of the counter a signal on conductor 42 sets bistable 37 and activates switch S1, applying the reference signal to the other terminal of amplifier 13. This commences the return ramp and initiates interval $T_{x2}$ which is being counted by counter 42. Upon arrival of the ramp at the datum level, an output is produced by comparator circuit 36 which causes the count at that instant to be transferred to the storage and display unit 38. An output from comparator 36 likewise resets bistable circuit 37, terminating the $V_R$ signal from switch S1 to the integrator. Since the counter is still running, a new ramp is initiated and interval $T_f$ commences again. The sequence can be repetitively accomplished so long as the unknown resistance and the voltage supplies are connected.

Figure 6:
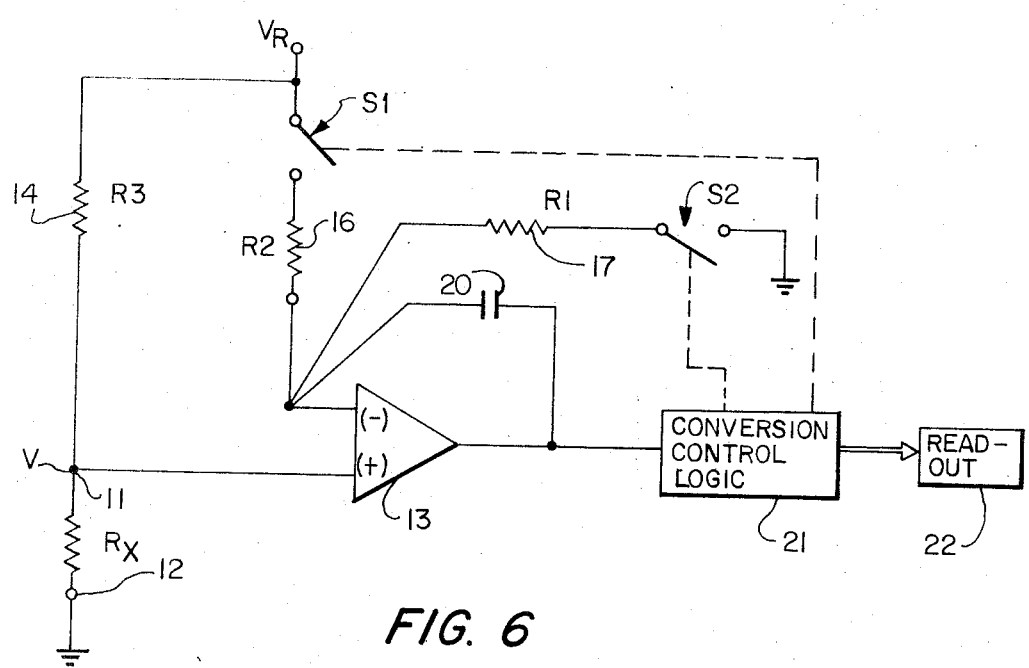
FIG. 6 is a schematic diagram, partly in block form of a second embodiment of the invention.

An alternative embodiment of the apparatus of FIG. 1 is shown in FIG. 6 wherein similar parts are identified by similar reference numerals, the primary difference being the provision of an additional switch S2 and its connection to reference voltage source and R1.

In the embodiment of FIG. 6, the operation is based upon the same general principle as that described with reference to FIG. 1, and the mathematical development, while of little importance to the explanation, is also somewhat different. In the operation of the apparatus of FIG. 6, switch S2 is closed by the conversion control logic for a fixed interval which can be identified as $T_1$ and switch S1 is then closed for an interval of time which is variable but which is a fraction of the interval which would be required if a full scale value were applied to the input of the device. Thus, during the initial fixed interval, determined by the clock as described with reference to FIG. 5, the current applied and integrated is a function of the input signal and of the reference voltage taken in conjunction with resistor 17.

Then, during the second interval, the reverse signal to return the ramp to its datum level is dependent solely upon the signal developed by $V_R$, the unknown $V$, and R2. This ramp is measured by the clock, logic and counter in a manner similar to that of FIG. 1 until a datum is reached at which time a readout is obtained.

It can be demonstrated that the relationship between the values in the apparatus of FIG. 6 is such that the value of the unknown resistor is again linearly proportional to the interval of time for which switch S2 is closed. The proportionality constant is a function solely of the values of the fixed resistors in the circuit, as previously described with reference to equation (7). The readout, accordingly, is linearly representative of the unknown resistance, which was to be measured.

As previously suggested, the invention can be adapted to a voltage-to-frequency converter of the type which produces a train of pulses of variable frequency as a function of the magnitude of the input signal. To describe this embodiment, reference is again made to FIG. 1 in which the conversion control logic 21 can now be regarded as a converter of well-known type having, among the other usual logic elements, a threshold detector which triggers a pulse generator. The signal appearing on line 23 to close switch S1 then becomes a train of pulses of fixed width and having variable spacing and amplitude, these variables being determined by the value $R_x$ of the unknown resistor. Switch S1 is thus repetitively closed by each such pulse for a constant, small time interval, and is caused to be opened for a plurality of intervals having variable spacing, depending upon the value of the unknown resistor. The frequency of the closures of S1 is directly proportional to $R_x$.

The quantity which is displayed by readout device 22 is then derived by counting the number of pulses produced by the pulse generator of logic unit 21 during some constant preselected time interval. As will be recognized, the value at the output of the integrator at any point in time during the operation of the foregoing embodiment has no particular relationship to the value of the unknown resistor; but the frequency of the generator output as a result of the repeated arrival at the threshold of the integrator output produces a meaningful measure of ohmic value, which measure is linearly related to the value of the resistor over a wide resistance range.

While certain advantageous embodiments have been chosen to illustrate the invention, it will be understood by those skilled in the art that various changes and modifications can be made therein without departing from the scope of the invention as defined in the appended claims.

What is claimed is:

1. Apparatus for providing an output signal the magnitude of which is linearly representative of the value of an unknown resistance comprising the combination of a source of voltage;
means for defining a measurement interval; resistor circuit means for connecting said source of voltage to one terminal of the unknown resistance to be measured during at least part of said measurement interval;
a resistive circuit of known value;

switch means for selectively completing a circuit between said voltage source and one end of said resistive circuit;

integrator circuit means having input terminals connected to said one terminal of the unknown resistance and to an intermediate point of said resistive circuit for combining the signals developed at those points during a measurement interval; and means connected to said means for defining a measurement interval for responding to the output of said integrator circuit means for controlling said switch means.

2. Apparatus according to claim 1 and further comprising means for displaying a value proportional to the output of said integrator circuit means at the end a measurement interval as a representation of the resistance of the unknown.

3. A digital ohmmeter comprising the combination of a differential amplifier having a capacitor connected between the output and an input thereof to form an integrating amplifier;

a source of DC potential;

circuit means forming a bridge circuit comprising
a first resistor;
terminals connectable to an unknown resistor to place the unknown resistor in series circuit relationship with said first resistor between said source and ground;
second and third resistors connected in series circuit relationship; and
switch means operable to selectively connect disconnect said second and third resistors to said source and ground;

circuit means connecting the junction between said first and unknown resistors to one input of said differential amplifier and the junction between said second and third resistors to the other input of said amplifier;

timing means for controlling the operation of said apparatus;

means responsive to said timing means and to the output of said amplifier for producing a digital drive signal linearly representative of the value of the unknown resistor; and means for displaying said value.

4. An ohmmeter according to claim 3 wherein
said switch means includes
first switch means for selectively connecting said second resistor to said source; and
second switch means for connecting said third resistor to ground only when said second resistor is disconnected from said source.

* * * * *